United States Patent Office 3,204,847
Patented Sept. 7, 1965

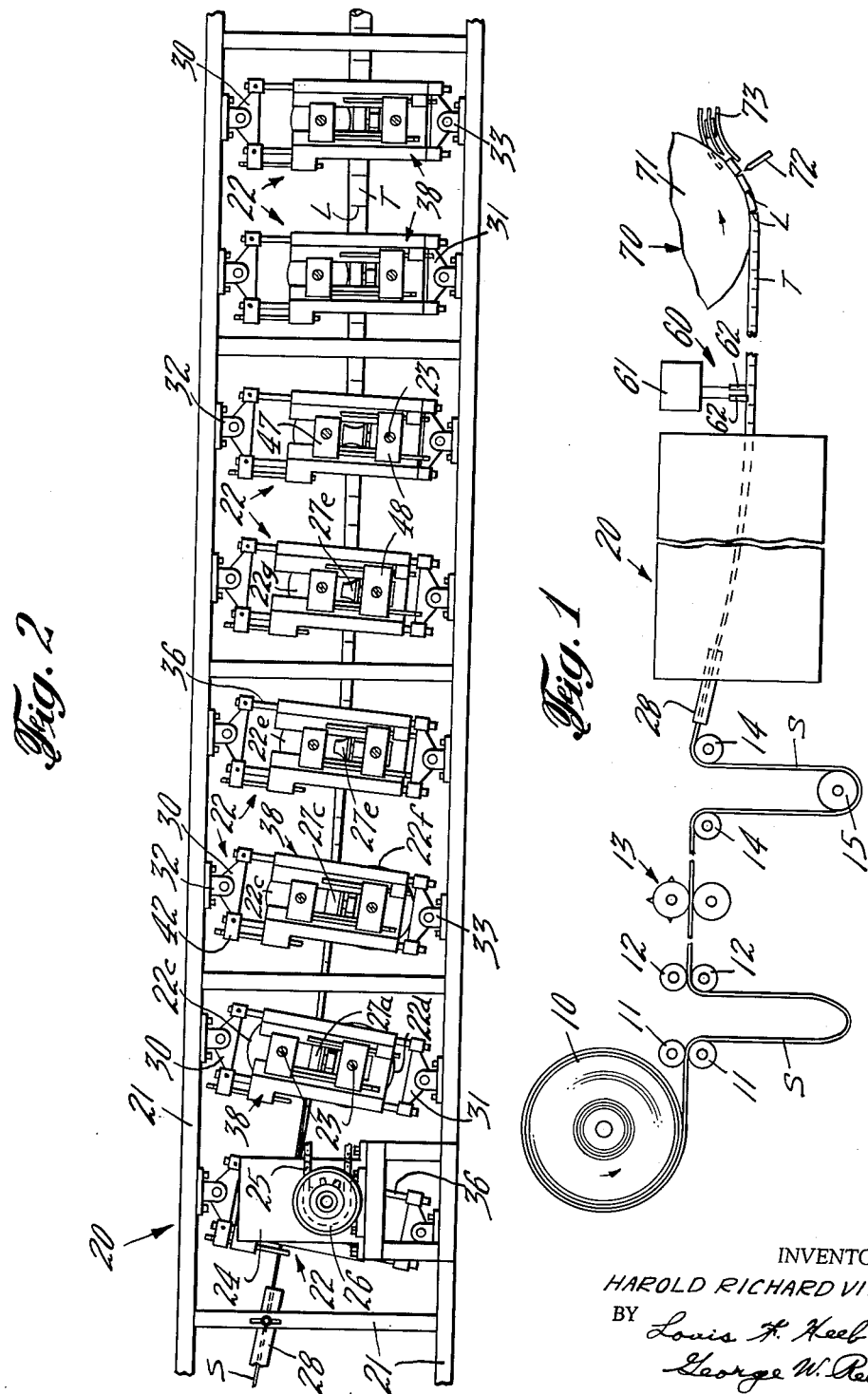

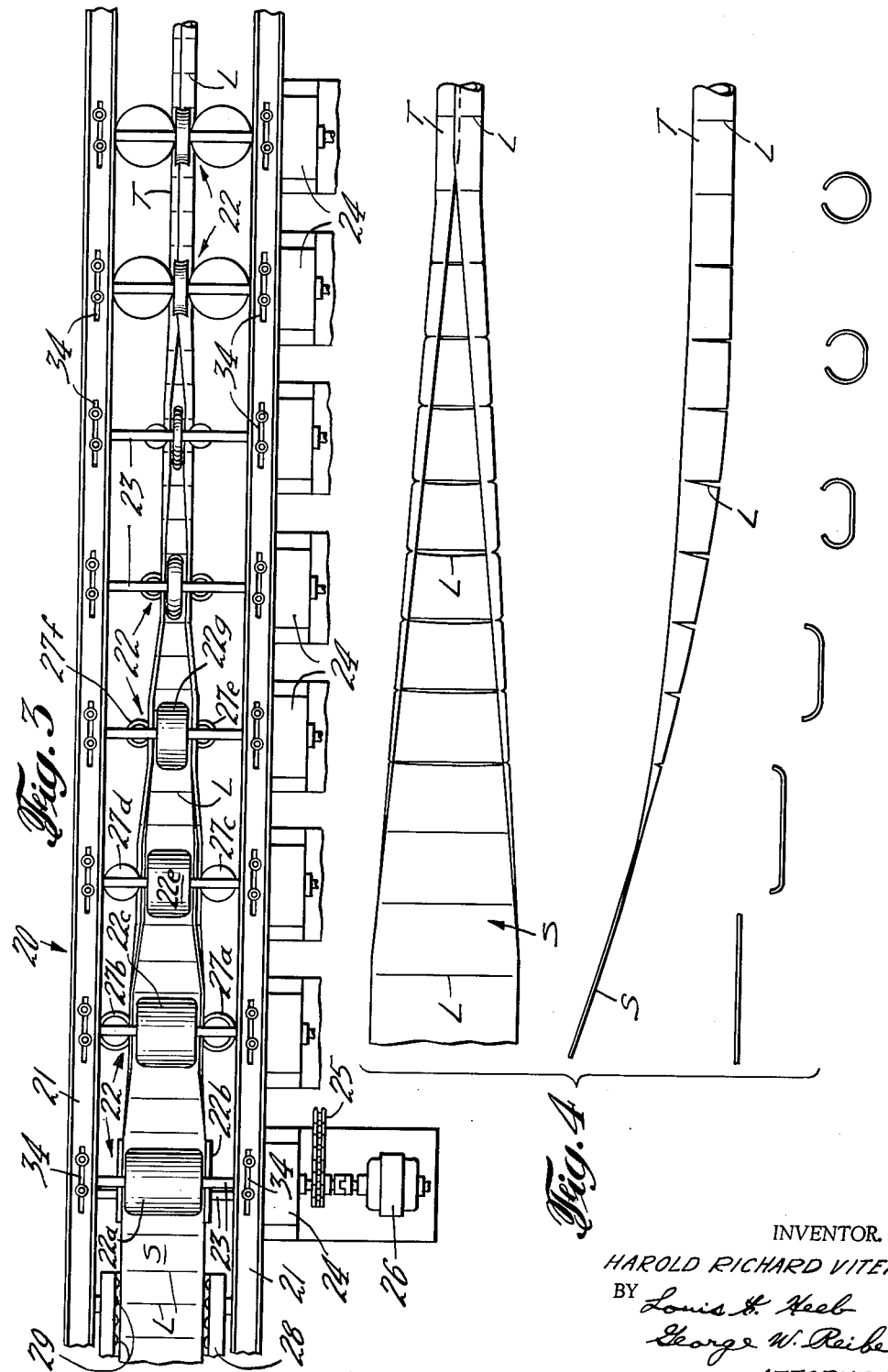

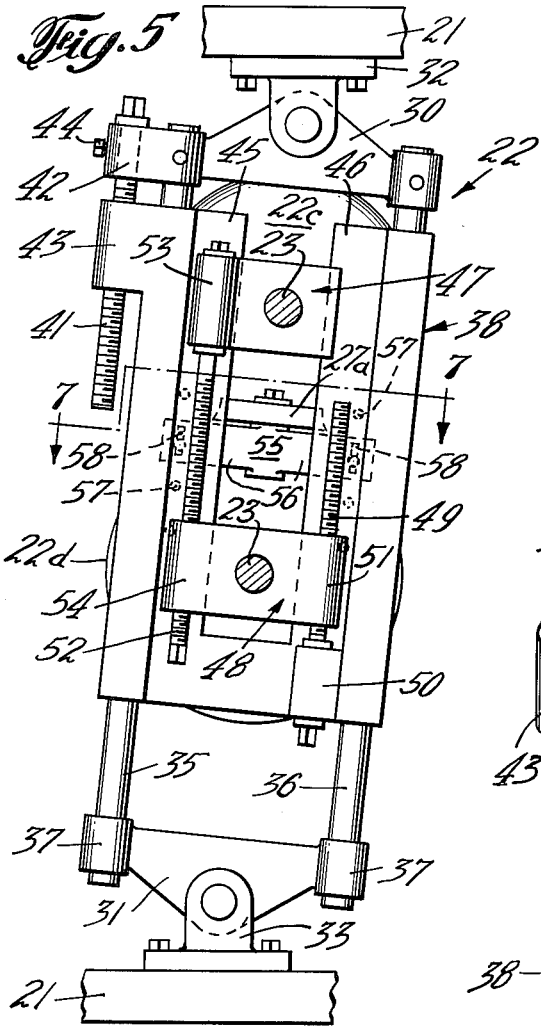
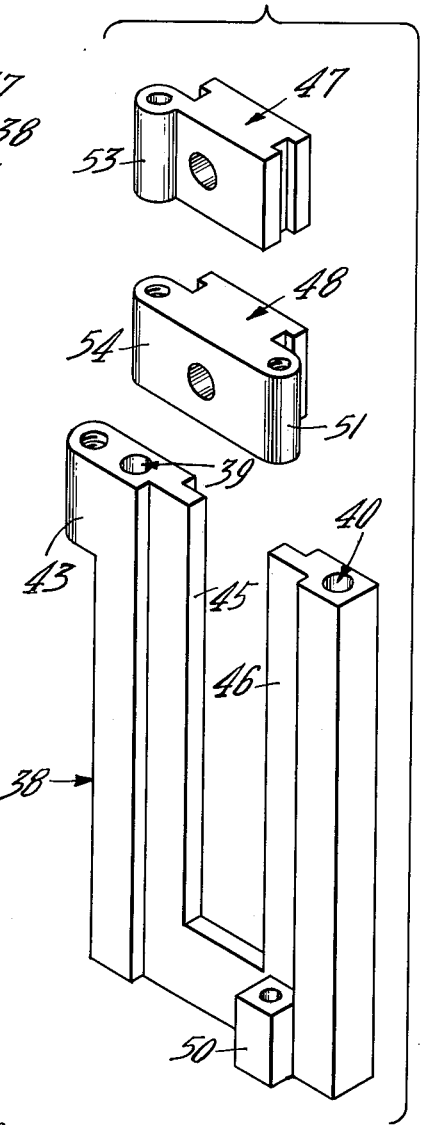
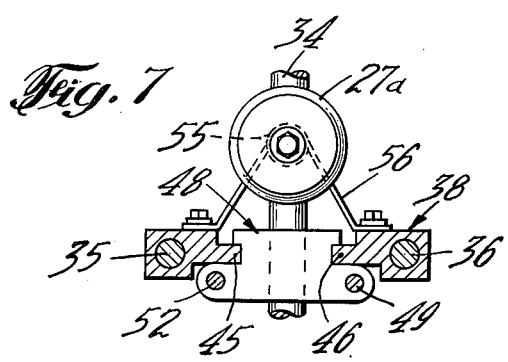

3,204,847
TUBE FORMING APPARATUS
Harold Richard Vitense, Mundelein, Ill., assignor to American Can Company, New York, N.Y., a corporation of New Jersey
Filed July 9, 1962, Ser. No. 208,435
3 Claims. (Cl. 228—14)

This invention relates to forming sheet material, including thin metal skelp in strip or coil form, into tubular configuration. It has to do particularly with improvements in the art of can manufacture and is addressed primarily to apparatus for milling into tubular form a continuous strip of can body stock which has been pre-slit into body-length increments along incomplete lateral lines of severance.

Developments in the art of can manufacture in recent years have been directed toward increased production speeds and techniques for overcoming the limitations of discontinuous motions inherent in conventional body makers. The trend has encompassed resistance welding; and such prior art as United States Patents 2,098,989, 2,177,104, 2,444,463 and 2,444,465 attests to the effort that has gone into the development of continuous tube welding techniques. More recently, significant improvements in certain aspects of continuous can body manufacture have occurred whereby high speed production of high-quality can bodies by welding techniques heretofore considered impracticable now appears commercially feasible and economic. One such improvement is described in United States Patents 2,984,138 and 2,997,904, and pertains to method and means for severing a pre-slit tube into individual can bodies as it emerges from a high speed continuous welder.

The present invention contemplates another improvement bearing on the practicability of continuous can body manufacture. It is concerned specifically with the tube shaping operation or that station in the line ordinarily known as the tubing mill. Tubing mills contemplated for continuous can body manufacture are fundamentally like those employed for many years in the production of metal pipe, conduit, sheathing, etc. These take many forms and, although contoured dies and endless belts are used in certain tubing operations, tubing mills incorporating a series of forming rolls, such as illustrated in previously mentioned Patent 2,098,989, for example, are more common. A mill of this type is preferred for working thin metal can stock because of greater versatility and more positive control over the stock throughout the successive bending passes.

Continuous tube milling by the prior art technique is not entirely free of difficulty. A fundamental problem lies in the rather unique stress pattern developed when coil stock is subjected to successive shaping passes to transform it into tubular shape. When a normally flat skelp is bent inwardly from its longitudinal edges and these edges are progressively drawn into converging relation, the degree of lateral deformation occurring in succeeding increments of the skelp progressively increases outwardly from the longitudinal center toward the edges. Since the practice in the prior art has been to position the forming rolls so that their coacting surfaces are substantially coplanar, the central portion of the skelp is maintained in a more-or-less linear path throughout the shaping passes whereas those portions nearest the longitudinal edges are subjected to rather severe curvature. The resulting bending stresses have both longitudinal and vertical components, the effect being to subject the skelp to slight longitudinal stretching which occurs as a maximum nearest the edges.

This problem is not too acute at slow milling speeds and with heavy stock capable of withstanding the adverse stresses thus created; but high speed milling of relatively thin and flexible stock is another matter. Any non-uniform stretching of the skelp tends to induce longitudinal flexure which, unless compensated for, results in irregular buckling and rippling which is quite pronounced in thin gauge stock. This problem is particularly serious when milling pre-scored or pre-slit can body stock having lateral lines of severance at spaced intervals therealong at speeds presently contemplated. Any local buckling or rippling occurring during the shaping operation tends to deform and elongate the pre-scored area or crowd the lateral slit edges in pre-slit stock into abrading contact and frequently results in jams and serious damage to these edges to the extent that many of the can bodies when formed must either be finished to remove the nicks and dents or discarded as waste.

An object, therefore, of the present invention is to overcome the problems encountered in prior art continuous tube milling techniques.

A further object of this invention is the provision of an apparatus for milling tubing which compensates for adverse forming stresses encountered in the forming operation.

Still another object of this invention is the provision of a tubing mill for forming skelp into continuous tubing at high speeds without encountering irregular buckling and rippling in the skelp as it is shaped.

Yet another object of this invention is the provision of a tubing mill for high-speed can body manufacture which is capable of transforming thin metal skelp, pre-slit or pre-scored in body-length increments along incomplete lateral lines of severance, into tubular configuration without subjecting the slit edges or pre-scored areas to deformation or abusive crowding and abrading contact.

Numerous other objects and advantages of the invention will be apparent as it is better understood from the following description, which, taken in connection with the accompanying drawings, discloses a preferred embodiment thereof.

These objects are achieved by feeding a skelp longitudinally along a predetermined path into a tubing mill, subjecting the skelp as it moves through the mill to successive shaping passes to bend succeeding increments progressively into tubular form, and substantially simultaneously subjecting certain of the increments to a predetermined longitudinal curvature as they are progressively formed to counteract the tendency of the skelp to buckle and ripple under the influence of forming stresses. The tubing mill is constructed so that certain ones of the successive shaping passes occur on a controlled arcuate path of feed, the curvature of which is an approximate function of the rate of incremental bending occurring in succeeding increments of the skelp as it moves through the mill.

Referring to the drawings:

FIGURE 1 is a schematic view illustrating a continuous can body line incorporating the present invention;

FIG. 2 is a side elevational view of an arrangement of apparatus incorporating the present invention;

FIG. 3 is a plan view of the apparatus of FIG. 2 with parts broken away;

FIG. 4 is a graphical view illustrating a continuous, pre-slit can body strip milled in the manner of the present invention;

FIG. 5 is an enlarged side elevational view of one of the operative elements of the apparatus shown in FIG. 3;

FIG. 6 is an exploded perspective view of the elements shown in FIG. 5;

FIG. 7 is a sectional view taken substantially along line 7—7 of FIG. 5.

A manufacturing line and process for forming can bodies in a continuous operation from coiled metal stock necessarily involve many stages and may take several forms. FIG. 1 represents a preferred or exemplary embodiment of such a line and illustrates in rudimentary fashion various essential stages of the operation. Although the present invention relates to but one stage of the operation, namely, the tube forming station ordinarily known as the tubing mill, nevertheless a general description of the entire operation enables greater comprehension of the significance of the invention to successful high speed continuous can manufacture.

Described briefly, the operation entails supplying a strip or skelp generally designated S from a pay-off coil 10 and feeding it continuously through the various work stations constituting the line. Strip S has a width approximately the peripheral dimension of the can bodies to be formed therefrom, taking into account preliminary edge trimming, if any, and allowing for the formation of a welded side seam of either butt or lap configuration. The strip may be any thin sheet metal customarily used in the manufacture of can bodies, such as tin plate, black plate or the like, but it will be understood that the line and the invention herein described are equally suited for the manufacture of continuous tubing from other types of materials, such as fibre, plastic, and various laminated stock.

From pay-off coil 10, strip S is fed by a pair of pinch rolls 11, 11 through a slack loop and then through another pair of pinch rolls 12, 12 on to a series of preliminary work stations. These may include such operations as edge trimming, lithographing, coating, drying, slitting, etc.; but for the sake of simplicity, only the slitting station generally designated 13 is shown. At this station, strip S is pre-slit into body length increments with lateral lines of severance L (see FIG. 4) which preferably extend substantially the full width of the strip, terminating just short of the longitudinal edges to leave unsevered continuous margins a fraction of an inch or so wide which eventually make up the side seam and are later severed to form individual can bodies. The slitter mechanism at station 13 may be of any suitable construction, examples being those described in above-mentioned Patents Nos. 2,444,463 and 2,444,465.

The now laterally pre-slit strip S next moves through a tensioning loop over a pair of guide rolls 14, 14 and looping roll 15, and then into the tube milling station to which the instant invention is specifically directed. The tubing mill, herein generally designated 20, may be of any desired construction capable of progressively transforming the continuously moving strip S into tubular form. As previously mentioned and as will be described hereinafter in full detail, the preferred form of mill 20 found most satisfactory for the high-speed can line presently contemplated comprises a series of forming rolls for subjecting the strip to successive shaping passes in a controlled path of travel.

From the tubing mill, the now tubular shaped strip is advanced to a welding station generally designated 60. As the strip moves into the welding station, the longitudinal edges which are to form the welded side seam, whether butt or lap configuration, are brought into welding contact in a well-known manner. Generally, these edges converge in a V-shaped pattern under the control of an insulated guide means which may be in the form of a narrow positioning roller or some type of Z-bar or hourglass roll arrangement (not shown). The welding unit preferably is of a high frequency resistance type and may comprise a generator power source 61 feeding a pair of brush electrodes 62 which engage the converging edges slightly ahead of the weld zone and fuse the continuous edges of strip S into a longitudinal continuous seam, thereby forming a continuous tube T.

The now seam welded tube T emerges from the welding station 60 and passes through what may be several treatment stations (not shown) preparatory to final forming of the individual can bodies. Included among these may be stations for internal spray coating, side seam stripping, baking, etc. Eventually, the completed tube arrives at a cut-off station generally designated 70, which preferably is of the type described in Patent No. 2,984,138 hereinbefore mentioned. At this station, the continuous tube is passed over a polygonal wheel 71 to separate the lateral slits L an amount sufficient to permit access of a blade 72 which severs the welded edges co-incidently with the lateral slits. As the can bodies become separated, they pass into a chute 73 and are transferred to a storage area or to some subsequent operation, such as a flanger (not shown).

A preferred form of tube mill 20 and certain of its operational features are shown in FIGURES 2 and 3. Generally, the mill comprises a frame 21 in which is mounted a series of roll stations generally designated 22 which may vary in number, depending on the nature of the particular milling operation to be performed. An eight-station mill of the type illustrated has been found desirable for continuous can body manufacture. At the various roll stations are the usual sets of coacting shaping rolls 22a, 22b, 22c, 22d, etc., which may be of any desired configurations adapted to subject strip S to successive shaping passes as it moves therethrough to progressively transform it into tubular form. These rolls are of gradually decreasing width and, as shown, the final rolls in the series may be of the conventional hour glass configuration for bringing the converging edges of the strip into final lapped or butting relation, as the case may be.

Each set of shaping rolls are keyed or otherwise fixed to parallel shafts 23 which are supported in frame 21 by adjustable supporting means, the detail construction of which will be more fully described hereinafter. The rolls may be driven by a common chain or a series of motors, but preferably are driven separately through individual gear boxes 24 connected to the respective roll shafts 23 so as to enable a greater degree of control of the respective roll stations. Each gear box 24 may be driven by a chain or belt 25 geared to a common drive shaft of a motor 26.

In addition to the coacting shaping rolls 22a, 22b, 22c, 22d, etc., certain of the stations 22 are provided with edging or conforming rolls 27a, 27b, 27c, etc., which are mounted on opposite sides of the frame 21 and are appropriately shaped to assist in turning the longitudinal edges of strip S laterally inwardly as it is progressively formed into tubular shape.

A guide track or table 28 having small rollers 29 spaced on opposite side thereof for engaging and guiding the strip S as it moves into the first roll station 22 is adjustably mounted to the front or entrance end of mill 20. Table 28 is vertically adjustable with respect to frame 21 in order to vary the inclination of the path of travel of the strip S as it enters the mill.

The roll stations 22 are disposed at progressively diverging angles of inclination along frame 21 with respect to table 28 so that the nips of the series of coacting shaping rolls 22a, 22b, 22c, 22d, etc. define an arcuate path of travel of predetermined upward curvature for strip S as it moves therethrough. The reason for this particular arrangement of the roll stations is to counteract or compensate for the rather severe bending stresses occurring in the strip as it is subjected to successive shaping passes in the shaping rolls. The nature of this stress problem may be undertood to a limited degree by reference to FIG. 3, showing the strip S moving through the entire length of mill 20, and with greater clarity by reference to FIG. 4 which is an exaggerated graphical representation of the strip being progressively bent into tubular configuration. As shown, the bending occurring in succeeding increments of the strip, although largely lateral in direction, has a definite longitudinal component which results from the fact that the opposite longitudinal edges of the strip are progressively turned upwardly from a coplanar position and inwardly into converging relation as the strip is transformed into tube T. This two-dimensional bending creates a rather unique stress pattern in the strip which manifests itself in the tendency of the strip to inherently assume a longitudinal curvature upwardly from its originally linear path of travel. This tendency to flex or assume a definite curvature is, in effect, proportional to the rate of incremental bending occurring in the strip. That is, the greater the rate of lateral (and the corresponding longitudinal) bending, the greater the flexing influence of the resulting bending stresses.

It will be appreciated that where strip S is of heavy gauge material and milling speeds are sufficiently slow to minimize the effect of this problem on the operation, this tendency of the strip to flex is not a serious consideration. This is seen in the conventional practice of the prior art, where multiple-roll mills are used, to arrange the roll stations so that the roll nips are substantially coplanar or in horizontal alignment throughout. But where strip S is of thin gauge stock, such as is ordinarily used in can manufacture, and particularly where it is pre-scored or pre-slit in body length increments prior to milling, the problem is much more acute. This is so because, unlike heavier gauge material, can body stock is less capable of absorbing or withstanding the buckling and distorting effect of the bending stresses. Moreover, the presence of lateral slits L at spaced intervals along the strip weakens the strip to the extent that the raw cut edges bordering slits L receive the full impact of the stress deformation. It will be seen that if the various forming rolls 22a, 22b, 22c, 22d, etc. were exactly horizontally aligned, as is customary in the prior art, strip S rather than assuming a longitudinal curvature as it is formed would be constrained to a generally straight-line path with the obvious result that the consequent bending stresses would be manifested in a stretching of the continuous longitudinal edges of the strip. The composite effect of this stretching along the edges of the strip and of the local buckling or distortion occurring in succeeding increments of the strip has been found to cause the raw cut edges at slits L to crowd and overlap, frequently resulting in mill jamming and severe damage to these edges in the way of nicks, dents and cut which impair the quality of the can bodies thus formed.

The present invention overcomes this problem by subjecting strip S to deliberate longitudinal curvature which approximates as close as is determinable that path which the strip would inherently assume under the influence of the bending stresses as just explained. That is, the roll stations 22 are appropriately disposed in the frame 21 so that the nips of the successive rolls 22a, 22b, 22c, 22d, etc., define an upward arcuate path of travel, the curvature of which is an approximate function of the rate of incremental bending occurring in the strip as it moves through the arcuate path. As shown in FIG. 4, this induced flexure compensates for or counteracts the distorting effect of the bending stresses and reduces the tendency of the longitudinal edges of the strip to stretch as they approach convergence, thereby allowing the cut edges bordering slits L to temporarily draw away from each other to avoid the damaging effect of abrading contact and to return to a parallel relation only after the stress distortion diminishes.

Depending on operating conditions, such as the nature and thickness of the strip material, the rate of and degree of incremental bending, the length of can bodies to be formed, and to some extent the speed of milling, the amount of curvature required and its optimum position in the mill will vary. For example, in forming standard 207.5 x 406 (eg., 2⁷·⁵⁄₁₆ in dia. x 4⁶⁄₁₆ in high), 207.5 x 413, 207.5 x 511 and 303 x 406 can bodies from 85 pound gauge stock at speeds in the range of 275 ft. or 731 cans per minute, an arrangement found to give effective correction of the stress deformation problem was achieved by positioning only the first four sets of rolls in the eight-station mill at increasing angles of inclination to define a total curvature of 6°, the first two stations being inclined at 6° from the vertical in linear alignment with guide table 28, the third at 3½°, the fourth at 1½°, and the remaining stations in a linear path on the horizontal. In this particular instance, the geometry of the selected shaping rolls and their respective axes in the mill were such that the most severe bending stress and consequent deformation occurred in these earlier shaping passes and, accordingly, confining the corrective curvature to only these four stations proved satisfactory. In other instances, it may be more desirable to impart the corrective curvature to the strip in the intermediate roll stations or throughout all the roll stations, again depending on operational factors. For this reason, it is desirable that each roll station 22 be readily adjustable so that mill 20 is capable of more versatile operation over a wide range of possible arcuate paths of feed.

An exemplary but by no means exclusive construction of roll stations 22 for achieving the desired versatility is illustrated in FIGURES 5–7. Aside from those differences previously described in the geometry of the various shaping rolls 22a, 22b, 22c, 22d, etc. and conforming rolls 27a, 27b, 27c, etc., the supporting elements may be identical for each station. Therefore, only one such station will be described, it being understood that the operative elements are duplicated on each side of the mill 20 to provide supporting structure on opposite sides of each shaping roll. There is provided a pair of yokes 30, 31 pivotally mounted to upper and lower rails respectively of frame 21 on brackets 32, 33 which are bolted to the frame in slots 34 (see FIG. 3). Connecting the two yokes 30, 31 are a pair of support rods 35, 36 which are pinned or otherwise rigidly fixed to the upper yoke 30 and are slidably secured in bored-out bosses 37 formed on the lower yoke 31.

A generally U-shaped slide block 38 having parallel bores 39, 40 through which rods 35, 36 extend is slidably supported on these bars and is adjustably secured to upper yoke 30 by a threaded worm 41 which is rotatably mounted in a bored-out boss 42 formed on the upper yoke and is threaded into a corresponding boss 43 on slide block 38. A set screw 44 locks worm 41 and thereby slide block 38 in a selected position on support rod 35, 36. The U-shaped slide block is provided with inner parallel ribs 45, 46 of finely finished surfaces on which is slidably mounted a pair of bearing blocks 47, 48 in which the shaping roll shafts 23 are journaled. The lower bearing block 48 is adjustably connected to slide block 38 by means of a worm 49 which is rotatably mounted in a bored-out boss 50 on the slide block and threads into a corresponding tapped projection 51 formed on bearing block 48. In a similar manner, upper bearing block 47 is adjustable with respect to lower bearing block 48 by means of a micrometer screw 52 rotatably carried in a bored-out boss 53 in the upper bearing and which threads into another tapped projection 54 in the lower bearing. Alternately, upper bearing block 47 may be biased with respect to lower bearing block 48, such as by means of a coil spring support (not shown), so that the coacting shaping rolls at the various stations are relatively yieldable and thus capable of adapting to minute variations or irregularities in the thickness of strip S.

The edging rolls 27a, 27b, 27c, etc. on each side of the shaping rolls are also supported on slide block 38 in a suitable manner, an example being in a bearing 55 held by a bracket 56 bolted to the slide block. To enable the position of the edging rolls to be adjusted with respect to the slide block 38, the latter may be provided with two parallel rows of spaced, tapped holes 57, and bracket 56 may have corresponding slots 58 aligned with these holes.

From the above description it will be apparent that the various roll stations 22 may be selectively adjusted to vary the X and Y coordinates of the respective shaping roll centers and thereby position the nips of these rolls to define a virtually infinite number of different arcuate paths. First, the desired inclination of each of the shaping rolls 22a, 22b, 22c, 22d, etc. and the angular disposition of their respective centers are established by sliding brackets 32, 33 in slots 34 to a selected position and then bolting these brackets securely to frame 21. Next, each set of shaping rolls is initially positioned in unison vertically of the frame by adjusting slide block 38 on support rods 35, 36 by means of worm 41. A final adjustment of each roll set in unison is then made by means of worm 49 to position the roll centers at those points corresponding to a calculated or predetermined longitudinal curvature. Then, a minute adjustment of micrometer screw 52 is made to establish the nip or relatively spacing of the rolls to the accommodation of strip stock of some selected thickness. Minor adjustments of worm 49 and screw 52 can thereafter be made following a test run or at times during operation of the mill to maintain the roll stations at their optimum settings without having to disturb the basic setting of each station.

It is thought that the invention and many of its attendant advantages will be understood from the foregoing description and it will be apparent that various changes may be made in the form, construction, and arrangement of the parts of the apparatus mentioned herein, without departing from the spirit and scope of the invention or sacrificing all of its material advantages, the apparatus and process hereinbefore described being merely a preferred embodiment thereof.

I claim:

1. In a tubing mill for the manufacture of can body tubing from metal coil strip, the strip being of a width substantially that of the desired peripheral dimension of can bodies to be formed therefrom and being laterally preslit except for its longitudinal margins in body-length increments, the combination comprising:

longitudinally extending spaced frame members defining therebetween a feed path for said strip;
a plurality of roll stations extending between said frame members at spaced intervals therealong;
each of said roll stations including a pair of contoured coacting shaping rolls which engage the upper and lower surfaces of said strip as it passes along its feed path;
a plurality of said roll stations also including a pair of contoured conforming rolls which engage the opposite longitudinal edges of said strip as it passes therebetween;
means positively driving said shaping rolls and thus causing said strip to be fed along its feed path from an inlet end to an outlet end;
said shaping rolls being of progressively decreasing width and said conforming rolls being of progressively increasing curvature from said inlet end to said outlet end and thus gradually converting said strip into a tubular configuration as it proceeds along the feed path;
supporting means at each of said roll stations for supporting said shaping rolls and said conforming rolls between said spaced frame members;
said supporting means being inclined an acute angle from a true vertical position, said acute angle defining the angle of inclination at each roll station;
said acute angle of inclination being a maximum at the inlet end roll station and progressively diminishing at succeeding roll stations until it reaches zero at some roll station before the outlet end of said feed path;
the overall effect of said progressively diminishing angles of inclination being to subject said strip to a longitudinal curvature as it is fed along its feed path to thereby maintain the edges of the lateral slits in uncrowded relation;
welding means adjacent the outlet end of said feed path for continuously welding the longitudinal edges of said now tubular strip to form can body tubing; and
severing means for cutting through the unsevered portions of said can body tubing coincidently with the pre-slit portions to thus separate the can body tubing into individual can bodies.

2. The combination defined in claim 1 wherein said supporting means are adjustably inclined to permit the angle of inclination at each roll station to be varied to accommodate coil strip of varying size and thickness.

3. The combination defined in claim 2 wherein said supporting means are adjustably mounted within said frame members to permit variable positioning of said roll stations longitudinally along said feed path.

References Cited by the Examiner

UNITED STATES PATENTS

| | | | |
|---|---|---|---|
| 2,012,795 | 8/35 | Park | 153—54 |
| 2,098,989 | 11/37 | Yoder | 113—33 |
| 2,911,030 | 11/59 | Kocks | 113—33 |
| 2,997,904 | 8/61 | Gotsch et al. | 153—54 |
| 3,001,569 | 9/61 | Gradt | 113—33 |
| 3,005,480 | 10/61 | Slechta | 113—33 |

CHARLES W. LANHAM, *Primary Examiner.*

WHITMORE A. WILTZ, *Examiner.*